United States Patent
Gibson et al.

(10) Patent No.: US 7,274,326 B2
(45) Date of Patent: Sep. 25, 2007

(54) SYSTEM FOR DIGITAL MULTI-BANDWIDTH INTERMEDIATE FREQUENCY PROCESSING AND TRACKING

(75) Inventors: Timothy P. Gibson, Overland Park, KS (US); Charles K. Hanneman, Overland Park, KS (US)

(73) Assignee: Honeywell International Inc., Morristown, NJ (US)

( * ) Notice: Subject to any disclaimer, the term of this patent is extended or adjusted under 35 U.S.C. 154(b) by 217 days.

(21) Appl. No.: 11/066,888

(22) Filed: Feb. 24, 2005

(65) Prior Publication Data

US 2006/0187114 A1   Aug. 24, 2006

(51) Int. Cl.
G01S 13/00   (2006.01)
H04B 1/38   (2006.01)

(52) U.S. Cl. .................. 342/195; 375/219; 342/159
(58) Field of Classification Search ............... 342/329, 342/195, 159; 375/219
See application file for complete search history.

(56) References Cited

U.S. PATENT DOCUMENTS

| | | | |
|---|---|---|---|
| 4,600,924 A | | 7/1986 | Lobsinger et al. |
| 5,654,716 A | | 8/1997 | Donovan et al. |
| 5,909,193 A | * | 6/1999 | Phillips et al. ............... 342/410 |
| 6,072,994 A | * | 6/2000 | Phillips et al. ................. 455/84 |
| 6,559,645 B2 | * | 5/2003 | Arndt et al. .................. 324/329 |
| 6,678,512 B1 | * | 1/2004 | Kaminski et al. ........... 455/334 |
| 6,741,847 B1 | * | 5/2004 | Claxton et al. ............. 455/306 |
| 6,898,235 B1 | * | 5/2005 | Carlin et al. ................. 375/219 |
| 2002/0163346 A1 | * | 11/2002 | Arndt et al. ................. 324/639 |

OTHER PUBLICATIONS

Hunt Engineering—"Digital Down Conversion (DDC) Theory"—first on Jun. 26, 2003 and last revision on Jan. 8, 2006.*
Holger Berndt* and Hans-Joachim Jentschel—ADC Residual Dynamic Range Constraints in Multistandard Mobile Terminals employing Wideband-IF Sampling.*

* cited by examiner

Primary Examiner—Thomas H. Tarcza
Assistant Examiner—Harry Liu

(57) ABSTRACT

Signal processing systems for radar installations are provided for simultaneous processing of one or more IF signals of dynamically varying frequency and bandwidth with a single analog signal path. The signal processing system includes, but is not limited to, a converter configured to digitize a return signal resulting in a digitized broadband signal, and a signal processor coupled to the converter. The signal processor includes a digital filter having a center frequency and a bandwidth, and the digital filter is configured to select a signal from the digitized broadband signal. The selected signal has a center frequency. The signal processor is configured to match the center frequency of the digital filter with the center frequency of the selected signal, and adjust the bandwidth of the digital filter based on the selected signal.

20 Claims, 2 Drawing Sheets

SYSTEM FOR DIGITAL MULTI-BANDWIDTH INTERMEDIATE FREQUENCY PROCESSING AND TRACKING

FIELD OF THE INVENTION

The present invention generally relates to a radar system, and more particularly relates to a system for digital signal processing in a radar receiver.

BACKGROUND OF THE INVENTION

A conventional radar installation for small airborne platforms (e.g., light aircraft) uses a relatively small antenna, in comparison with ground based installations or large aircraft, having less gain. A magnetron is generally used with the small antenna because the magnetron is capable of generating a high power pulse in a small area, which allows the small antenna to have a greater range. The high power pulse is transmitted and a return signal is generated as a reflection of the high power pulse from an object, such as weather. The return signal is processed through a relatively narrow bandwidth to maximize a signal-to-noise ratio. For example, an Intermediate Frequency (IF) filtering bandwidth is matched in size to the information bandwidth of the transmitted pulse and is narrow relative to the intermediate frequency.

The magnetron may drift in frequency with a fluctuation of temperature and other factors, and the drift can be on an order of tens of megahertz for a low cost magnetron. This drift generally affects high-performance radar installations that have narrow bandwidth processing, and most magnetron radar installations include circuitry for tracking and compensating for magnetron drift.

One common practice is to use circuitry based on a tuned local oscillator, adjusted to track magnetron drift, that produces a fixed IF and that is followed by a fixed narrow bandwidth IF filter. One example is an analog Automatic Frequency Control (AFC) circuitry having a Voltage Controlled Oscillator (VCO). The VCO is typically constantly adjusted to center a mixed received signal (i.e., based on the return signal) at the fixed IF and within the IF filter bandwidth. The analog AFC circuitry, as well as the VCO, may experience performance variations, such may result from component variation, temperature, aging, and replacement of obsolete parts. These variations may limit the operational quality of the system, increase the size and complexity of the system, and/or require costly circuit components and custom factory alignment.

Additionally, the conventional magnetron radar installation typically has a single IF with a unique bandwidth, and an analog signal path is generally used for processing a single unique IF signal/bandwidth. To process multiple simultaneous and unique IF signals/bandwidths, a typical radar installation architecture uses multiple conventional receivers, each providing an analog signal path with each receiver generally subject to the aforementioned associated performance variations. The addition of receivers also increases an overall cost associated with the radar installation. Further, injection-locked magnetron based radar installations may be implemented with fewer performance variations, resulting from frequency drift, than the conventional magnetron radar installation but at significantly more expense and size than the conventional magnetron radar installation. Solid-state, non-magnetron based radar installations may also be implemented with fewer performance variations but tend to have inadequate power for the small antenna used in light aircraft installations.

Accordingly, it is desirable to provide a relatively cost-effective radar receiver without an analog AFC circuitry. In addition, it is desirable to provide a radar receiver having simultaneous processing of several IF signals of dynamically varying frequencies and bandwidths with a single analog signal path. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Signal processing systems for radar installations are provided for simultaneous processing of one or more IF signals of dynamically varying frequencies and filter bandwidths with a single analog signal path. In one embodiment, a signal processing system is provided for a radar installation receiving a return signal, the signal processing system includes, but is not limited to, a converter configured to digitize the return signal resulting in a digitized broadband signal, and a signal processor coupled to the converter. The signal processor includes a digital filter having a center frequency and a bandwidth, and the digital filter is configured to select a signal from the digitized broadband signal. The selected signal has a center frequency. The signal processor is configured to match the center frequency of the digital filter with the center frequency of the selected signal, and adjust the bandwidth of the digital filter based on the selected signal.

In another embodiment, a signal processing system is provided for a radar installation receiving a return signal having an unknown and varying transmitter frequency. The signal processing system includes, but is not limited to, a mixing stage having an output and configured to mix the return signal by a fixed reference frequency to produce a broadband IF signal at the output of the mixing stage, an ADC having an input coupled to the output of the mixing stage and having an output, and a signal processor coupled to the output of the ADC. The converter is configured to digitize the broadband IF signal to produce a broadband digitized signal. The first signal processor is configured to concurrently and digitally process a plurality of narrow band IF signals from the broadband digitized signal.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention may be described herein in terms of functional block diagrams. Those of skill in the art will appreciate that such functional blocks may be realized in many different forms of hardware, firmware, and/or software components configured to perform the various functions. For example, the present invention employs various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein.

Figure 1:
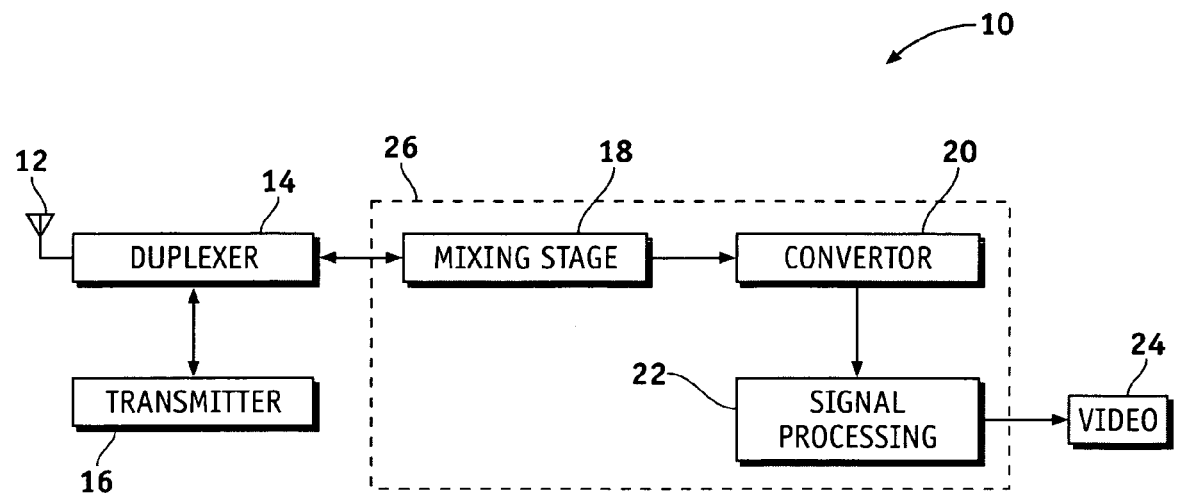
FIG. 1 is a schematic diagram illustrating an exemplary embodiment of a radar installation.

Referring to the drawings, FIG. 1 is a schematic diagram illustrating an exemplary embodiment of a radar installation 10. The radar installation 10 includes, but is not limited to, a transmitter 16 generating radio wave signals, a duplexer 14 having an input coupled to the transmitter 16, an antenna 12 coupled to the duplexer 14, and a receiver 26 coupled to an output of the duplexer 14 that processes return signals to provide detection and ranging of a radar operation environment. Although the radar installation 10 is described in terms of a combined transmitter/receiver unit, the radar installation 10 may also be configured to have a separate transmitter unit and a receiver unit while both sharing the same antenna 12 or each operating with separate antennae.

The transmitter 16 generates the radio wave signals at a carrier frequency. The carrier frequency is generally selected based upon a desired environment (e.g., weather and/or terrain) for detection/ranging. For example, a carrier frequency of about 10 GHz is commonly used for weather monitoring. The term detection/ranging is referred to herein as a radar function of determining the existence and intensity of a target (detection) and determining a distance to the target (ranging) using the time between transmitting a pulse and receiving a reflection.

The duplexer 14 operates to transmit the radio wave signals from the transmitter 16 and receive return signals, such as echoed from surrounding terrain, based on the transmitted signals via the antenna 12. For example, the radio wave signals are passed through the duplexer 14 to the antenna 12 and are radiated into space by the antenna 12 along an antenna beam. Reflections, or return signals, from objects within the antenna beam return to the antenna 12 and pass from the antenna 12 to the duplexer 14 and from the duplexer 14 to the receiver 26.

The receiver 26 includes, but is not limited to, a fixed frequency or a step-wise adjustable mixing stage 18 having an input coupled to the duplexer 14, a broadband Analog-to-Digital Converter (ADC) 20 having an input coupled to an output of the mixing stage 18, a signal processing unit 22 having an input coupled to an output of the ADC 20, and an output device such as a video display 24 coupled to an output of the signal processing unit 22. The mixing stage 18 mixes the return signals from the duplexer 14 to an IF band suitable for conversion. The receiver 26 is capable of simultaneous selection, filtering, and processing of one or more narrowband IF signals with a single analog signal path from the duplexer 14 to the ADC 20. Each of such narrowband IF signals has a dynamically varying (e.g., varying in real-time) frequency and bandwidth and is derived from the broadband IF return signal.

The mixing stage 18 has a reference frequency, produced by a Local Oscillator (LO) 37 (FIG. 2) and described in greater detail hereinafter, and mixes the return signals from the duplexer 14 with the reference frequency to produce a broadband IF signal. The ADC 20 is capable of sampling a substantially wide signal bandwidth and dynamic range, constituting a capture window, based upon the sampling rate and the effective number of bits of the ADC 20. The ADC 20 samples the broadband IF signal from the mixing stage 16 to produce a digitized broadband IF signal, and the digitized signal is subsequently transferred from the ADC 20 to the signal processing unit 22. The signal processing unit 22 frequency selects, filters, and decimates the digitized signal into one or more narrower band (e.g., matched to the information bandwidth to be extracted from the transmitted signal) signals for extracting detection/ranging information.

Figure 2:
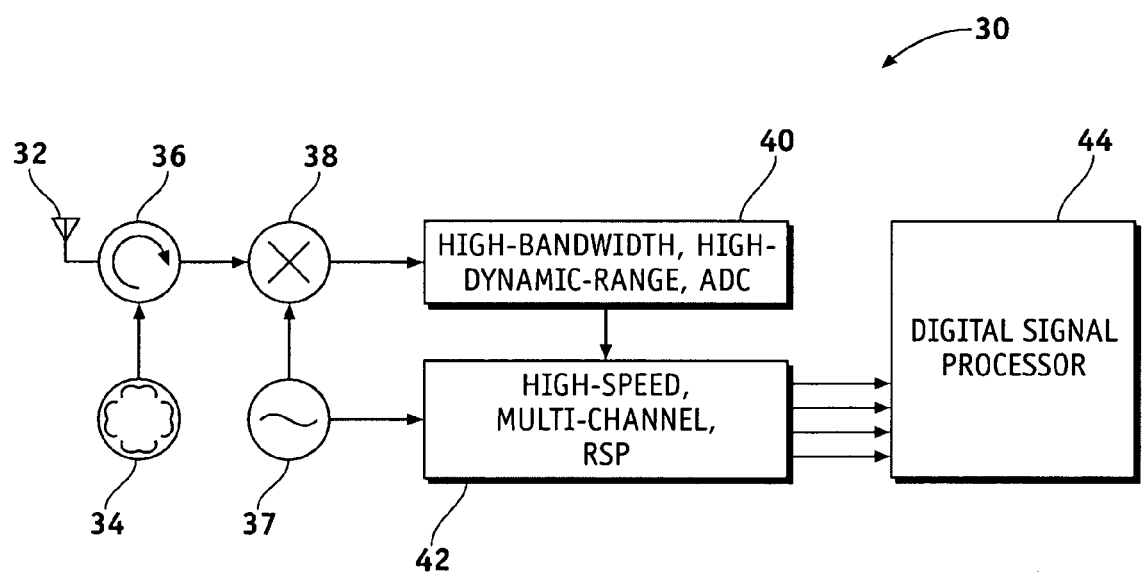
FIG. 2 is a schematic diagram illustrating an exemplary embodiment of a signal processing system for the radar installation.

FIG. 2 is a schematic diagram illustrating an exemplary embodiment of a signal processing system 30 for the radar installation, such as the radar installation 10 shown in FIG. 1. In this exemplary embodiment, the signal processing system 30 includes, but is not limited to, a magnetron 34 that generates the radio wave signals, a circulator 36 having an input coupled to the magnetron 34 and that transmits the radio wave signals and receives return signals via the antenna 32 coupled to the circulator 36, a mixer 38 having a first input coupled to an output of the circulator 36, a LO 37 coupled to a second input of the mixer 38 to provide the reference frequency, or mixing frequency, for mixing the return signal, an ADC 40 having an input coupled to an output of the mixer 38, such as by way of a gain stage and a broadband filter, to sample the mixed return signal, a digital down-conversion and filtering unit 42 having input coupled to an output of the ADC 40, and a Digital Signal Processor (DSP) 44 coupled to an output of the digital down-conversion and filtering unit 42 for further processing of the detection/ranging information. Because the transmission frequency of a return signal may be unknown to the receiver 26 (FIG. 1) for signal processing and because the LO 37 lacks the ability for fine adjustment to correct for transmission frequency drift, the receiver 26 (FIG. 1) has a broadband IF following the mixer 38.

The LO 37 generates a discrete fixed frequency for the reference frequency. Conventional low-cost, low-tolerant/high-yield, fixed oscillators are suitably used for the LO 37. In an alternative embodiment, the LO 37 is a switchable oscillator that generates two or more discrete, far-spaced, fixed frequencies for step-wise increments. In the event that a bandwidth for tracking transmitter frequency drift is needed that is in excess of the capture window of the ADC 40, such as in some cases of magnetron frequency drift, the LO 37 may switch to one of the discrete frequencies to shift the reference frequency received by the mixer 38 and move the received signal into the capture bandwidth of the ADC 40. In this alternative embodiment, the tolerance of the LO 37 for such discrete frequencies may also be low such that low-cost oscillators may be suitably used.

The digital down-conversion and filtering unit 42 is a high-speed, multi-channel digital processor having independent digital signal paths for simultaneously processing different IF signals. The digital down-conversion and filtering unit 42 may designate and dynamically adjust (e.g., in real-time) a different selection frequency and bandwidth for each of the signal paths or channels. Each of the signal paths of the digital down-conversion and filtering unit 42 are processed independently for various uses in the DSP 44. For example, a first signal path is assigned to transmitter frequency drift tracking, a second signal path is assigned to narrow band receive signal processing, and a third signal path is assigned to wider band receive signal processing.

The bandwidth of the IF for a particular signal path may be adjusted by the digital down-conversion and filtering unit 42 to accommodate a particular function of the signal processing system 30, such as weather detection, ground mapping, search mode, and the like. For example, when signal processing in a weather mode, a pre-determined amount of bandwidth is used for volume detection of a storm cell while simultaneously executing, in a different signal path, a correlation algorithm with the magnetron signal for higher-resolution ground mapping. Examples of the digital down-conversion and filtering unit 42 include an AD6624A receive signal processor and the like. Although various functions are described herein in the context of a processor structure, those of skill in the art will appreciate that one or more of such functions may be accomplished with special use digital hardware, a software configured digital signal processor, or a combination of both.

The DSP 44 receives baseband signals from the various independent signal paths from the digital down-conversion and filtering unit 42. In one exemplary embodiment, the DSP 44 contains one or more programs that utilize the data from the various signal paths to produce a desired output or to conduct further data processing. For example, the DSP 44 may include a module for converting the detection/ranging information contained in the various signal paths to a video data stream for output on the display 24 (FIG. 1).

Figure 3:
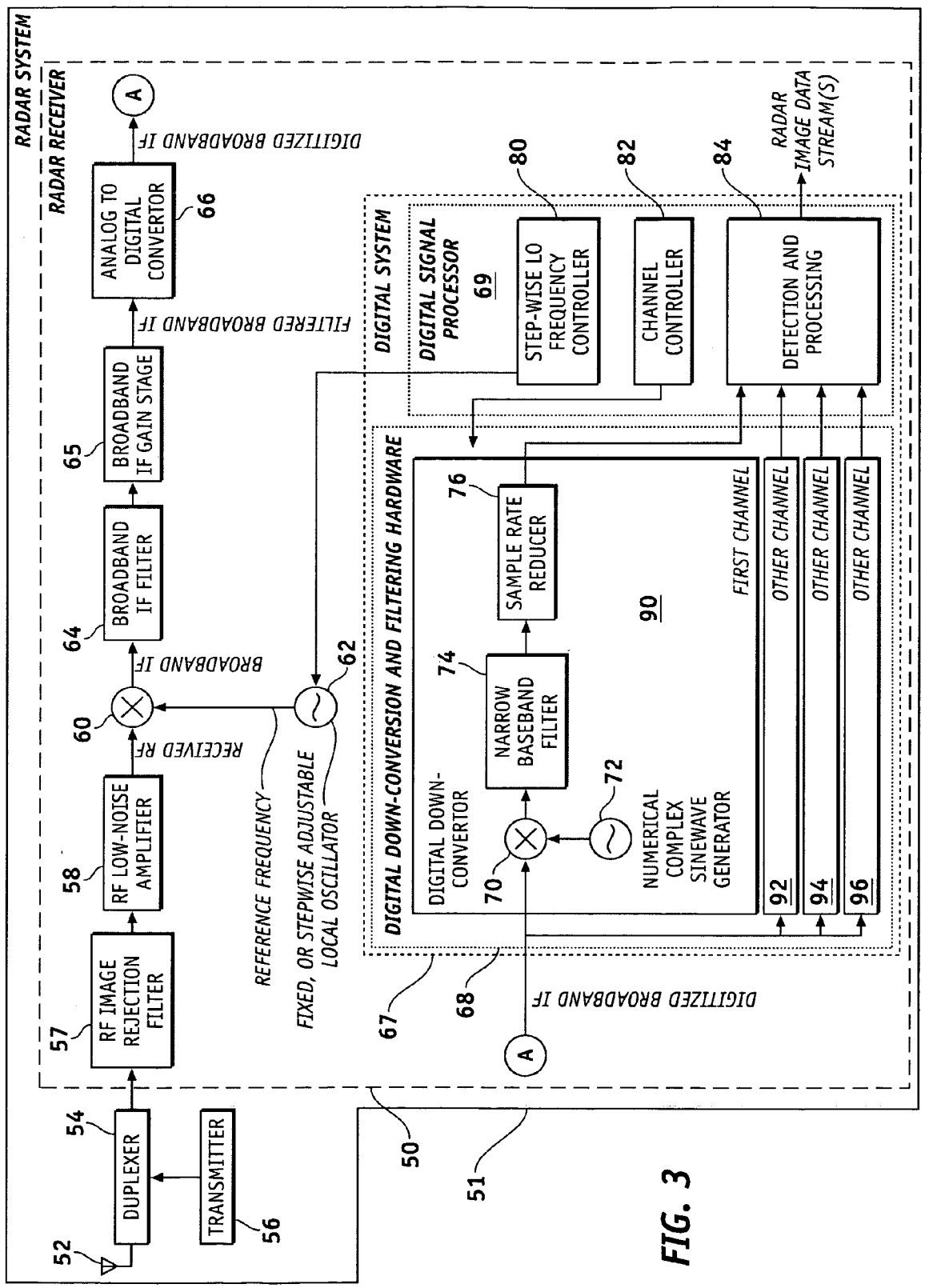
FIG. 3 is a schematic diagram illustrating another more detailed exemplary embodiment of a signal processing system for the radar installation.

FIG. 3 is a schematic diagram illustrating another more detailed exemplary embodiment of a signal processing system 50 for a radar installation 51, such as the radar installation 10 shown in FIG. 1. In this exemplary embodiment, the radar installation 51 includes, but is not necessarily limited to: a transmitter 56; a duplexer 54 having a transmit signal input coupled to the transmitter 56 and having a receive signal input, a receive signal output, and a transmit signal output; an antenna 52 coupled to the transmit signal output and the receive signal input of the duplexer 54; and, the previously mentioned signal processing system 50 coupled to the receive signal output of the duplexer 54.

The signal processing system 50 includes an RF image rejection filter 57 having an an input coupled to the receive signal output of the duplexer 54 and having an output, an RF low-noise amplifier 58 having an input coupled the output of the RF image rejection filter 57 and having an output, a mixer 60 having a signal input coupled to the output of the RF low-noise amplifier 58 and having a reference input and an output, a fixed or step-wise adjustable LO 62 coupled to the reference input of the mixer 60, a broadband IF filter 64 having an input coupled to the output of the mixer 60, a broadband IF gain stage having an input coupled to an output of the broadband IF filter 64, an ADC 66 having an input coupled to an output of the broadband IF gain stage 65, and a digital system 67 coupled to an output of the ADC 66.

The RF image rejection filter 57 and RF low-noise amplifier 58 condition the return signal or received RF signal for mixing at the mixer 60. The LO 62 produces the reference frequency, and the conditioned RF signal is mixed with the reference frequency at the mixer 60 to produce the received IF signal. The received IF signal is filtered by the broadband IF filter 64. In this exemplary embodiment, the digital system 67 includes a DSP 69 having a frequency controller 80, described in greater detail hereinafter, configured to control the LO 62 for step-wise adjustment of the reference frequency to match the broadband IF filter 64 with the capture bandwidth of the ADC 66. The broadband IF gain stage matches the filtered received IF signal with the dynamic range of the ADC 66 to produce the filtered broadband IF signal, and the ADC 66 samples the broadband filtered IF signal to produce the digitized broadband IF signal.

The digital system 67 includes a digital down-conversion and filtering unit 68 having an input receiving the digitized broadband IF signal from the ADC 66 and having a one or more outputs, each corresponding to a different processing channel 90, 92, 94, 96 in the digital down-conversion and filtering unit 68, selectively coupled to a digital signal processor 69. The digital system 67 may include various firmware and/or software for accomplishing the functions of the components of the digital system 67 described in greater detail hereinbelow. The digital system 67 may assign each individual processing channel 90, 92, 94, 96 to a different signal processing task, such as the volume detection of a storm cell and the correlation algorithm for higher-resolution ground mapping, and a separate desired signal is extracted from the digitized broadband IF signal for processing in a corresponding processing channel 90, 92, 94, 96. A single digital channel may be used to track magnetron drift, and this data may then be used to predict subsequently received return signals and adjust the reference frequency of either the digital filter 74 or the digital down conversion and filtering unit 68.

In an exemplary embodiment, each channel 90, 92, 94, 96, of the digital down-conversion and filtering unit 68 includes, but is not limited t sinewave generator 72; a mixer 70 having a first input receiving the digitized broadband IF signal and having a second input coupled to an output of the sinewave generator 72 for digital down-conversion of the digitized broadband IF signal; a narrow baseband digital filter 74 having an input coupled to an output of the mixer 70 and having an output; and, a sample rate reducer 76, or decimator, having an input coupled to the output of the baseband digital filter 74 and an output to produce the narrow baseband digitized signal. The narrow baseband digital filter 74 is matched to the information bandwidth. In one exemplary embodiment, a channel controller 82 in the DSP 69, described in greater detail hereinafter, controls the output signal of the sinewave generator 72 and the bandwidth of the narrow baseband digital filter 74 (e.g., controls the frequency selection of the sinewave generator 72 and the bandwidth of the narrow baseband digital filter 74).

The DSP 69 includes, but is not limited to, a detection and processing unit 84 having one or more inputs each coupled to a different output of the digital down-conversion and filtering unit 68, the previously mentioned channel controller 82 is selectively coupled to an input of the sinewave generator 72 of each operating channel 90, 92, 94, 96, and the previously mentioned step-wise LO frequency controller 80 is coupled to the fixed LO 62. The frequency controller 80 analyzes the narrow baseband digitized signal and may instruct the LO 62 to switch to one of the discrete frequencies to shift the reference frequency to the mixer 60 to move the received signal into the capture bandwidth of the ADC 66. The channel controller 82 analyzes the narrow baseband digitized signal and adjusts the bandwidth of the narrow baseband filter 74 and frequency of the sinewave generator 72 for extraction of the desired signal from the digitized broadband IF signal for processing in each of the channels 90, 92, 94, 96. In one exemplary embodiment, the DSP 69 or the digital down-conversion and filtering unit 68 track the magnetron drift, such as by collecting magnetron pulse information of prior-received return signals, and predicts the frequency and bandwidth of an in-bound return signals. From the predicted frequency and bandwidth, the channel controller 82 may automatically select the frequency of the sinewave generator 72 and adjust the bandwidth of the narrow baseband filter 74 to match the in-bound return signal. The DSP 69 or the digital down-conversion and filtering unit 68 may also be assigned the function of automatically selecting the frequency of the sinewave generator 72 and adjusting the bandwidth of the narrow baseband filter 74.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A signal processing system for a radar installation, the radar installation configured to produce a magnetron-based transmit signal and receive a return signal, the return signal based on the transmit signal, the signal processing system for extracting a narrow baseband signal from the return signal, the signal processing system comprising:
   a converter configured to digitize the return signal to a digitized broadband signal; and
   a signal processor coupled to said converter, said signal processor comprising a digital filter having a center frequency and a bandwidth, said digital filter configured to select a first signal from said digitized broadband signal, said first signal having a center frequency, said signal processor configured to:
      match said center frequency of said digital filter with said center frequency of said first signal; and
      adjust said bandwidth of said digital filter based on said first signal to extract the narrow baseband signal.

2. A signal processing system according to claim 1, wherein said converter comprises:
   an analog mixing stage having an input configured to receive the return signal and having an output, said analog mixing stage comprising a fixed local oscillator (LO) configured to generate a reference frequency, said analog mixing stage configured to produce a broadband intermediate frequency (IF) signal based on the return signal and said reference frequency; and
   an analog-to-digital converter (ADC) coupled to said output of said analog mixing stage, said ADC having a capture frequency window, said analog mixing stage configured to shift said broadband IF signal into said capture frequency window.

3. A signal processing system according to claim 1 wherein said converter comprises:
   an analog mixing stage comprising an LO configured to generate a reference frequency and step-wise adjust said reference frequency, said analog mixing stage configured to produce a broadband IF signal based on the return signal and said reference frequency; and
   an analog-to-digital converter (ADC) coupled to said analog mixing stage, said ADC having a capture frequency window, said analog mixing stage configured to shift said broadband IF signal into said capture frequency window.

4. A signal processing system according to claim 1, wherein said signal processor further comprises:
   a digital system having an input coupled to said converter and having an output coupled to said digital filter, said digital system configured to digitally down-convert said digitized broadband signal and comprising a numerical sine wave generator, said digital system further configured to control said numerical sine wave generator to match said center frequency of said first signal with said center frequency of said digital filter.

5. A signal processing system according to claim 1, wherein said signal processor comprises at least two digital filters, each of said at least two digital filters having a center frequency and a bandwidth, a first digital filter of said at least two digital filters configured to select said first signal from said digitized broadband signal, a second digital filter of said at least two digital filters configured to select a second signal from said digitized broadband signal, said second signal having a center frequency, said signal processor further configured to:
   match said center frequency of said first digital filter with said center frequency of said first signal and said center frequency of said second digital filter with said center frequency of said second signal; and
   adjust said bandwidth of said first digital filter based on said first signal and said second digital filter based on said second signal.

6. A signal processing system according to claim 1, wherein said signal processor is further configured to:
   track a magnetron drift based on at least one signal received by the radar installation prior to receiving the return signal; and
   predict a frequency and a bandwidth of the return signal based on said magnetron drift.

7. A signal processing system according to claim 1, wherein said signal processor is further configured to:
   track a magnetron drift based on at least one signal received by the radar installation prior to receiving the return signal; and
   match said center frequency of said digital filter with said center frequency of said first signal based on said magnetron drift;
   adjust said bandwidth of said digital filter based on said selected signal and said magnetron drift.

8. In a radar installation, a signal processing system for extracting a narrow baseband signal from a received broadband radio frequency (RF) signal, the broadband RF signal having an information band and based on a transmit signal, the signal processing system comprising:
   a magnetron configured to produce the transmit signal;
   a circulator coupled to said magnetron;
   an analog mixing stage having an input coupled to said circulator and configured to mix the received broadband RF signal with a reference frequency resulting in a broadband filtered intermediate frequency (IF) signal;
   a converter having an input coupled to said mixing stage and having an output, said converter configured to digitize the broadband filtered IF signal to produce a broadband digitized IF signal at said output; and
   a first signal processor coupled to said output of said converter, said first signal processor having a baseband filter bandwidth and configured to:
      center the information band in said baseband filter bandwidth; and
      digitally down-convert said broadband digitized IF signal resulting in the narrow baseband signal.

9. A signal processing system according to claim 8, wherein said first signal processor comprises:
- a waveform generator configured to generate a numerical complex sine wave based on a selection frequency;
- a mixer having an input and an output, said input of said mixer coupled to said waveform generator and said output of said converter, said mixer configured to mix said broadband digitized IF signal by said numerical complex sine wave; and
- a baseband digital filter having an input coupled to said output of said mixer.

10. A signal processing system according to claim 8, wherein said mixing stage comprises a local oscillator (LO) configured to adjust said reference frequency to at least one fixed frequency.

11. A signal processing system according to claim 10, wherein said mixing stage further comprises:
- a mixer having an input and an output, said input of said mixer coupled to said LO; and
- wherein said converter has a capture bandwidth and comprises:
  - a broadband IF filter having an input coupled to said output of said mixer and having a bandwidth matched to said capture bandwidth of said converter.

12. A signal processing system according to claim 10, wherein said converter has a capture bandwidth; and
wherein said LO has a first fixed frequency and a second fixed frequency, said LO further configured to:
- select said first fixed frequency as said reference frequency when the information band is within said capture bandwidth; and
- select said second fixed frequency when the information band is outside of said capture bandwidth.

13. A signal processing system according to claim 12 further comprising a second signal processor coupled to said first signal processor;
wherein said LO has an control input; and
wherein said second signal processor comprises a frequency controller coupled to said control input of said LO, said frequency controller configured to adjust said reference frequency to said at least one fixed frequency.

14. A signal processing system according to claim 13, wherein said second signal processor comprises an executable program product configured to:
- adjust said reference frequency to said at least one fixed frequency.

15. A signal processing system according to claim 8 further comprising a second signal processor coupled to said first signal processor, said second signal processor configured to extract detection information from said narrow baseband signal.

16. A signal processing system according to claim 15, wherein said first signal processor has an output; and
wherein said second signal processor comprises a detection and processing unit having an input coupled to said output of said first signal processor.

17. A signal processing system according to claim 16, wherein said first signal processor has a control input;
wherein said baseband digital filter has a variable bandwidth; and
wherein said second signal processor comprises a channel controller coupled with said control input of said first signal processor and configured to adjust said selection frequency of said waveform generator and said variable bandwidth of said baseband digital filter.

18. A signal processing system according to claim 17, wherein said second signal processor comprises an executable program product configured to:
- center the information band in said baseband filter bandwidth by adjusting said selection frequency of said waveform generator and said bandwidth of said baseband digital filter.

19. A signal processing system according to claim 17, wherein said second signal processor is further configured to:
- track a magnetron drift based on at least one signal received by the airborne radar installation prior to receiving the received broadband RF signal; and
- predict a frequency and a bandwidth of the broadband digitized IF signal based on said magnetron drift.

20. A signal processing system according to claim 19, wherein said second signal processor is further configured to:
- adjust said selection frequency of said waveform generator based on said predicted frequency; and
- adjust said variable bandwidth of said baseband digital filter based on said predicted bandwidth.

* * * * *